United States Patent Office 2,933,393
Patented Apr. 19, 1960

2,933,393
DRY CREAMING POWDER
Cecil K. Ortman, Amlin, Ohio, assignor to M & R Dietetic Laboratories, Inc., a corporation of Ohio No Drawing. Application November 4, 1957
Serial No. 694,100

20 Claims. (Cl. 99—56)

This application is a continuation-in-part of my application Serial No. 352,593, filed May 1, 1953, entitled "Dry Creaming Powder."

The present invention relates to a powdered milk product for creaming liquids, such as coffee, tea and similar beverages, soups and other edible liquid food products.

The requirements of a dried creaming powder for use in coffee and other hot beverages and liquid food products are very severe, because of the high acidity of both brewed and instant coffee being somewhere in the pH range of 4.8 to 6.30 and at the same time served at hot temperatures in the range of 120° F. to 190° F. Both these conditions require that creaming agents be suitably prepared so when added to this coffee the product will disperse without feathering, oiling, scumming, floating, curdling or showing lack of homogeneity. These properties are difficult to secure in a product derived from milk in part or in whole or from analogous materials by reason of the instability of the constituents of the milk. They are particularly difficult to secure in a dried powdered product intended to be used in the same manner as the so-called "instant soluble" coffees and coffee substitutes; that is, by placing a roughly measured amount of the powder on the surface of the hot beverage or liquid, allowing the powder to wet and sink through the surface, and dispersing throughout the liquid by stirring. In such products, rapid solubility is only one of the required properties. The necessary requirements for a satisfactory creaming powder are, among others, the following.

(1) On adding the powder to a hot beverage or liquid, say at 180° F., the powder should dissolve very rapidly when added to a hot beverage or liquid, say at 180° F., this action taking place within a few seconds.

(2) A desirable product should leave no floating material or undispersed material after brief stirring with a spoon. A product of the most desirable type will sink immediately to the bottom of the cup or vessel containing the liquid, without leaving floating particles, and will, as indicated above, promptly disperse and produce a creaming effect on very brief stirring.

(3) The product must produce a whitening or coloring effect equivalent to that of coffee cream, to the extent desired by the user, when employed at temperatures ranging as high as 180° F. to 190° F.

(4) The fat content of the powder should be stable under these temperature conditions, so that oil droplets do not form and rise to the surface of the liquid.

(5) The protein content of the powder should also be stable under the temperature conditions referred to above, so that no formation of curd particles or "feathering" takes place in liquids having a pH in the acid range of 4.8 to 6.3.

(6) The product should not impart a material sweetening effect, or a heated, evaporated or cooked flavor when used in coffee, tea or other beverages or food products; nor should it take away or cover up the true flavor of the beverage or liquid in which it is used.

None of the powder products commercially introduced heretofore has been able to satisfy all of the requirements set forth above. A commercially available spray dried or vacuum dried product comprising 25% to 45% skim milk solids, 15% to 40% fat and 35% to 60% lactose is taught to be useful as infant food. This food composition is stated to be readily soluble and dispersible in water. This product disperses in hot coffee in tests identical to those shown in the examples hereinafter set forth in about 10 to 17 minutes. In addition to slow dispersing, the product shows strong feathering. This product fails to meet the requirements 1, 2 and 5 enumerated hereinbefore.

Another powdered cream product, which has been available commercially, is prepared from skim milk which has been subjected to ion exchange treatment in order to remove calcium ions and alter the calcium to phosphorus ratios normally associated with skim milk. The product is prepared by combining butterfat with ion exchange treated skim milk, homogenize the mixture and spray drying the homogenizing mixture. This product when it has a calcium to phosphorus ratio in the range of 0.25 to about 0.55 is directly dispersible in hot coffee, i.e., can be added to coffee in the powdered form. Products having a calcium to phosphorus ratio of 0.55 to 0.9 are not directly dispersible in hot coffee. These latter cream products must be reconstituted into a liquid form before they can be dispersed in hot coffee without feathering and/or oiling.

The powder prepared in accordance with the present invention fully satisfies the enumerated requirements and has other desirable properties, as will be brought out hereinafter. As prepared in accordance with the present invention, the powder is a dried material, with a fat content, preferably butterfat, ranging from about 15% to about 42% and preferably in the order of 20% to 30%. The product includes milk solids resulting from the ion exchange treatment of fluid milk, either whole milk or skim milk, from which 55% to 85% of the calcium has been removed in the ion exchange treatment and in which the calcium to phosphorus ratio is in the range from 0.15 to 0.85. Such ion exchange treated fluid milk may be prepared, for example, by procedures of the character described in the patent to Louis H. Chrysler and Emory F. Almy, No. 2,503,866, granted April 11, 1950, and assigned to the assignee of the instant invention. As pointed out below, the milk solids with the low calcium to phosphorus ratio employed in the present invention may be secured in other ways, for example, by the use in whole or in part of commercial alkali metal caseinate, such as sodium or potassium caseinate, preferably of low salt content. In such case, the calcium to phosphorus ratio in the solids in the final product is still further reduced and may approach zero.

The product prepared in accordance with the present invention also includes added lactose, the amount of added lactose being in the range from 15% to 65% and preferably 30% to 65% of the total solids in the final powder. The total lactose in the final product may be in the range from about 30% to about 72%, and preferably is in the range from about 35% to about 65%. This added lactose changes the character of the condense so that solids content of 50% to 60% may be attained whereas the normal maximum concentration is about 40%. This increase in concentration not only helps efficiency of drying but permits production of dry particles of larger size, i.e. coarse particles of good melting character.

This addition of lactose is made in quantities more than just compensating for losses of lactose, for example, due to losses during ion exchange treatment. Lactose is added in quantities producing a large excess of lactose as compared to products prepared from skim milk having the normal ratios of components. The added lactose imparts to cream products (as compared to the products of the Chrysler and Almy process disclosed in Patent No. 2,503,866) improved wetting, dispersing and whitening properties. Products directly dispersible in hot coffee and basically the same as regards cream and skim milk content and differing only in lactose content as an integral part of the spray dried particles, when compared for dispersing properties show, for example, 75 seconds for dispersion when there is no added lactose and 4 to 6 seconds for dispersion of the products containing the added lactose. In addition, products having an initial calcium to phosphorus weight ratio in the range of 0.55 to 0.9 and no added lactose cannot be directly dispersed in hot coffee whereas the products of applicant's process having calcium to phosphorus weight ratios in this 0.55 to 0.85 range and containing added lactose are soluble and dispersible in hot coffee without feathering and oiling off when added directly in the powder form.

The lactose is added during the process of manufacture of the powder and prior to the final drying step in which it is formed, which is preferably a spray drying procedure. In the process, steps are preferably taken to secure a substantial conversion of the lactose content of the powder to the beta-lactose or beta-lactose anhydride form in addition to the conversion normally secured, as is more fully pointed out hereinafter. Since alpha lactose and beta lactose exist in the hydrate form in solution and in anhydride form in dry powders of low moisture content, it will be understood that the terms "lactose," "alpha lactose" and "beta lactose," as used herein apply to either form, depending on the nature of the material referred to.

In carrying out the drying process, adequate control is exercised in order to secure a product of a particle size to impart to the product the desired properties. It has been found that in order to secure these properties, the average particle size of the product should be mainly in the range of 80 to 200 microns, and with a minor proportion of finer material, not more than 40% passing through a 170 mesh U.S. standard screen, and preferably not more than 30% on subjecting the powder to a sieve test in the presence of 0.75% of a thoroughly admixed dry flow agent such as tricalcium phosphate of 300 mesh or finer. It is also important that the drying process be controlled to produce a product of not more than 2.75% moisture content and preferably less than 2.00%. The moisture content may be carried to as low a figure as is practical in the equipment used. By so carrying out the process as to produce a product having the aforesaid characteristics, a rapid dispersion of the product in hot coffee or other beverage or liquid may be effected without caking or lumping, and caking and lumping are likewise avoided in the package.

The invention will be more fully understood from the following description, in which the application of the process of the present invention to materials derived from milk is set forth by way of illustration.

Cream, suitably having approximately 40% butter-fat content, is admixed with ion exchange treated skim milk having a calcium to phosphorus ratio in the range from 0.15 to 0.85, and preferably 0.15 to 0.30, in proportion to provide in the mixture a ratio of total solids to butter-fat of from 1.5:1 to 2:1 and preferably from about 1.80:1 to 1.85:1. The mixture is subjected to vacuum evaporation, lactose, suitably in the form of edible milk sugar, being added before drying and preferably prior to the evaporation step. The lactose may, however, be added after the evaporation step. It is found that more desirable results are secured by the addition of the lactose prior to the evaporation or condensation of the mixture, since a greater concentration of solids in the condense may thereby be secured at a given viscosity, and this is helpful factor in securing the desired coarse particle size in the final drying step. The extent of condensation or evaporation are controlled to secure, in the liquid supplied to the final drying step, a total solids content of from 40% to 60% and preferably from 53% to 57%.

With the lactose added prior to the evaporation or condensation of the milk, it is desirable that the latter step be carried out at a temperature of at least 130° F. to 180° F. and preferably in the order to 150 to 160° F., thereby avoiding crystallization of the lactose. In general, the mixture of cream and ion exchange treated skim milk is heated to a temperature exceeding 130° F. and preferably 150° F. to 160° F. prior to the addition of the lactose to aid in its solution. By employing temperatures in the range above indicated during the evaporating or condensing step, crystallization of the lactose is prevented.

By condensing in the presence of the lactose, important additional advantages are secured. In the absence of the added lactose, evaporation of the mixture to a total solids content of more than 38% to 40% results in an undesirable increase in viscosity and a possibility of gelation and/or clot formation to a point where equipment may become inoperable. With the added lactose present, the total solids on evaporation can be raised to a substantially higher proportion of the condense, say in the order of 50% to 60% total solids, without causing undue increase in viscosity of the condense and without causing insolubility and non-dispersibility of the final product.

After the evaporation step, the condense is preferably homogenized while hot. If the lactose is not added prior to the evaporation step, it is added subsequent thereto and prior to homogenization.

Following the homogenization step, the liquid containing the added lactose is fed to a spray drier or other suitable drying apparatus to be converted into a dried product. Prior to drying, however, the liquid is preferably subjected to conditions to effect a substantial increase in the content of beta lactose in the final product. This is effected by heating the milk to a temperature of at least 203° F. and preferably in the order of 215° F. to 250° F. for a brief period, say 1 to 20 seconds. At higher temperatures in this range, the holding times should be shorter than at lower temperatures, to avoid browning of the powder product and development of off-tastes. Somewhat higher temperatures than 250° F. may be employed, but excessive care is required to avoid browning of the product. In this preheating step, the equilibrium of alpha lactose and beta lactose in the liquid is shifted in the direction of increasing the beta lactose content. Whereas normal milk powder contains only about 23% beta lactose and Chrysler and Almy cream powder contains only about 12.7% beta lactose, the product of this invention can contain as high as about 60% of the solids of the final product in the form of beta lactose. By using temperatures of say 160° F. to 203° F. or lower, for similar periods, about 62% of the lactose may be secured in the beta form, and even without a holding period, a product of good properties secured, with beta lactose in the proportion of 23% to 30% of the total powder. By employing a holding period as above described at temperatures from 203° F. to 250° F., the proportion of beta lactose may be increased to be within the range of 62% to approximately 100% of the total lactose, and preferably in excess of 74%. On drying, as by the spray drying process, the proportion of the beta lactose is stabilized at that reached in the solution. Since the dried beta lactose is more rapidly soluble than the alpha lactose, an increase in beta lactose content is highly desirable in securing an instantly soluble product in accordance with the present invention.

It is preferred that the proportion of beta lactose present be at least 70% of the total lactose.

In order to secure this result, the high temperature holding period for the liquid before entering the spray drier or other drying means may be secured, for example, by passing the liquid through a heated coil in which the desired temperature is secured and controlling the velocity of flow or the length of the coil to secure the desired holding time.

The preheated concentrate is then subjected to a conventional drying process and preferably to spray drying. The conditions of spray drying are controlled to secure a relatively coarse product, with a minor proportion of fines as hereinbefore indicated. The usual means of control, such as spray nozzles with relatively large orifices and the rates of flow as well as the temperatures are controlled to this end by conventional procedures. The high content of solids in the preheated condensed material which is secured by the process of the present invention, particularly when the addition of the lactose is effected prior to the condensing step, is an important factor in securing the desired particle size.

Drum drying or roller drying may be employed, if desired, the product being subsequently ground to coarse granular form, preferably in the size range above referred to. However, spray drying is preferred.

The product is dried to a moisture content not exceeding 2.75% and preferably not exceeding 2.5%. In general a product having 1.5% to 2.5% moisture is secured, although, if desired, the moisture content may be brought as low as is practical in the equipment used. By drying the product to such low moisture content, caking and lumping are prevented, although some loose agglomeration of particles occur. A minute proportion, say 0.25% to 0.75% of suitable dry, water insoluble edible flow agents, such as tricalcium phosphate or calcium silicate, etc., of, say, 300 mesh or finer, may be incorporated in the powder to improve its flowing properties, if desired.

The product prepared in accordance with the present invention is directly usable in creaming coffee and other beverages as well as other liquid food products, such as soups. Its properties as a creaming powder may be illustrated by its behavior when used in coffee. It may be most readily dispensed with a teaspoon. When the powder in the desired quantity is added to hot coffee, say at 170° F. to 180° F., it wets rapidly and immediately sinks to the bottom of cup or container without stirring. This is distinguished from other milk product powders which floats for considerable lengths of time and upon stirring sticks to the spoon or floats in unwetted lumps both on the surface and in the coffee or beverage. It disperses upon slight stirring into a homogenerous mixture with the coffee without feathering, breaking or curdling. The complete wetting (and dispersion) takes place in 4 to 6 seconds, and the homogeneous mixture is ready to drink. The whitening and creaming effect is the same as or better than that of coffee cream or of evaporated milk. The weight of butterfat in the powder prepared in accordance with the present invention is, however, appreciably less than that in the amount of either coffee cream or evaporated milk required to secure the same whitening effect. The coffee to which the creaming powder of the present invention is added is identical not only in appearance, but also in flavor with the same coffee to which a quantity of coffee cream has been added sufficient to give the same whitening effect.

The following examples are illustrative of the present invention in greater detail.

Example 1 (#3)

12.5 lbs. of 40% cream and 47.2 lbs. of fluid skim milk, previously treated with ion exchange material to effect the removal of about 80% of the calcium, were mixed and condensed under vacuum by conventional procedures at 150° F. to 40.5% total solids. In the ion exchange treated skim milk, the ratio of calcium to phosphorus was approximately 0.30. In the solids in the concentrate, 54% was butterfat and 46% non fat solids, of which 7.25% were derived from the cream and 38.75% were derived from the ion exchange treated skim milk. The ratio of total solids to butterfat was approximately 1.85. The concentrate was homogenized at about 150° F. and 2500 p.s.i. 9.1 lbs. of dry alpha lactose was added to the condense after raising the temperature of the latter to 170° F. The added lactose equaled in amount the total solids present in the concentrate. After the addition of the lactose, the total solids of the mixture was 57.0%. This mixture was low in viscosity and less viscous than evaporated skim milk at 38% total solids or than evaporated whole milk at 40% total solids, prepared at evaporator temperatures of 140° F. to 150° F.

The lactose-containing mixture was then further heated to 250° F. under pressure and held at this temperature for 8 second while flowing through a conventional tubular heater. It was then sprayed in a spray tower to secure a coarse powder containing approximately 2% moisture. The power had a butterfat content of 27.47%, was coarse in texture and was mainly in the particle size range of 80 to 200 microns with less than 3% fines (passing through a 170 mesh screen), and the particles clustered together in open or mesh-like aggregates. On testing the powder in coffee at 180° F., it showed the characteristic properties of the powders prepared in accordance with the present invention as described above. It wet and sank almost immediately to the bottom of the cup and was fully dispersed on stirring for 3.5 seconds. It showed excellent whitening power. No floating particles were present and no feathering or other objectionable appearance was produced.

In the powder prepared as above described, about 85% of the total lactose present was in the beta form. By preheating the mixture before spraying to a temperature above 130° F. and below 203° F. without extending holding time, conversion of about 45% to 62% of the added lactose to the beta form is secured. The powder prepared under these conditions is an effective creaming agent, although somewhat slower in dissolving than the powder prepared as hereinbefore described.

Example 2

34 lbs. of 40% cream were mixed with 133 lbs. of ion exchange skim milk similar to that used in the preceding example. Of the total solids in the resulting mixture, 54% was butterfat; 7.4% was solids not fat derived from the cream and 38.6% was solids not fat derived from the ion exchange skim milk. 24.75 lbs. of alpha lactose hydrate, an amount equal to the total solids of the liquid, was added and the resulting mixture was subjected to the usual vacuum evaporation process at a temperature of 150° F. to 160° F., to produce a condense of 55% total solids. The concentrate was brought to a temperature of 215° F. to 225° F. and held at this temperature for 12 to 14 seconds under pressure in a tubular heater, and spray dried to a coarse powder of the particle size hereinbefore set forth, with a moisture content less than 2%. An analysis of the final powder showed that it contained 27.5% butterfat and 60.48% lactose. The content of beta lactose in the final powder was 45.1%, or about 74.5% of the total lactose content.

The resulting powder, tested in coffee behaved in the characteristic way described of powders of the present invention. The time required for the powder to wet and fully disperse after sinking to the bottom of the cup, was slightly longer than was the case for the powder of Example 1, being 4.5 seconds. Its whitening ability was appreciably greater than was that of the powder of Example 1.

Example 3

20.13 lbs. of 40% cream was mixed with 74.65 lbs. of ion exchange treated skim milk such as was used in the preceding example. To the mixture, 4.81 lbs. of alpha lactose hydrate was added. This amounted to ⅓ of the total solids present in the mixture of cream and ion exchange skim milk. Of the solids in the mixture, 41% was butterfat, 34% was milk solids not fat derived from the cream and skim milk and 25% was added lactose. After addition of the lactose, the mixture was heated and condensed in the same manner as in the preceding examples, the concentrate containing 55% total solids. The concentrate was further heated to 215° F. and held at this temperature, under pressure, for 8 seconds. It was then spray dried to produce a coarse powder of the particle size hereinbefore referred to, with a moisture content less than 2%. This product contained 41.05 butterfat and 41.07% total lactose. Of the latter about 30% was beta lactose.

The powder had the same characteristics and behaved similarly to the powders resulting from the processes described in Examples 1 and 2. It required somewhat longer to disperse in hot coffee at 180° F., approximately 8 seconds being required. Its whitening ability was excellent, being somewhat superior to the powders of either Examples 1 or 2.

The proportion of added lactose may be varied in the range from 15% to 65% of the total solids of the mixture, corresponding to a range of total lactose of from about 30% to about 72% in the final powder. These powders have satisfactory creaming properties. It is preferred that the total lactose content of the powder be in the range from 35% to 65%.

Example 4

In the present example, a dispersion of alkali metal caseinate, suitably sodium caseinate was employed to supply in part the milk solids not fat. 35 lbs. of 40% cream were mixed with 66 lbs. of ion exchange skim milk and 32 lbs. of a sodium caseinate dispersion testing 14% total solids. In the resulting mixture, 54% of the solids was butterfat; 7.5% was solids not fat derived from the cream; 19% was solids not fat derived from the ion exchange skim milk and 19% was solids not fat derived from the sodium caseinate dispersion. The total solids in the mixture amounted to about 25.5 lbs. The same quantity of lactose in the form of alpha lactose hydrate was added and the resulting mixture evaporated under vacuum by the customary procedures to a concentrate having a solids content of 53%. The concentrate was homogenized, further heated to 215° F. and held at this temperature for 8 seconds. It was then spray dried to produce a coarse powder having the characteristics hereinbefore described. In the time required for the powder to disperse and dissolve and in its whitening ability, the powder produced in accordance with Example 4 had similar characteristics to the powder produced in accordance with Example 1 above, but with some modification of flavor due to the caseinate.

The powder produced in accordance with Example 4 had a butterfat content of 26.95% and a total lactose content of about 60.5%.

A powder was likewise prepared in a similar manner in which no skim milk was employed, all of the milk solids not fat other than those in the cream being provided in the form of sodium caseinate. A satisfactory product of somewhat slower rate of dispersion was secured, with a modified flavor due to the caseinate.

Example 5

In the present example, the ion exchange treated skim milk which was employed had been subjected to a less extensive calcium removal than the treated skim milk used in the preceding examples. In the preceding example, 70% to 80% of the calcium was removed from the skim milk, the resulting treated milk having a calcium to phosphorus ratio of about 0.30. In the present example, in the ion exchange treatment, only about 62% calcium removal was effected, the resulting skim milk having a calcium to phosphorus ratio of about 0.40 to 0.45.

In carrying out the process of the present invention in accordance with this example, the procedure followed was substantially the same as in Example 2. The resulting powder had properties essentially similar to those of the powder secured in Example 2. Notwithstanding the lesser degree of calcium removal from the skim milk the product was stable in hot coffee. Another batch was made in a similar manner, employing ion exchange treated skim milk in which 55% of the calcium was removed in the ion exchange treatment. The resulting powder had similar properties and was likewise stable when added to the hot coffee.

Example 6

An experiment was conducted to show the effect of adding lactose to a powder prepared by the same procedures as used in the preceding Example 2, except for the addition of the lactose prior to the drying step. 34.5 lbs. of 40% cream were mixed with 116 lbs. of ion exchange skim milk similar to that used in Example 2 above. The mixture was condensed under vacuum at a temperature of about 150° F. In the absence of the lactose, to avoid excessive viscosity and instability, the condensing step was carried to only 40% total solids. The concentrate was spray dried to a low moisture powder and 25 lbs. of beta lactose thoroughly intermixed therewith. The resulting powder was similar in particle size to that found necessary for the cream powder prepared according to the present invention. It had a butterfat content of 27.3% and a lactose content of 60.1%.

When the resulting powder was tested in hot coffee at 180° F., it was found to be slow in settling to the bottom of the cup and very slow in wetting and dispersing, 75 seconds or more of stirring being required to effect its dispersal. Its whitening ability was poorer than that of the powder resulting from the procedure according to Example 2.

In this experiment beta lactose was used because of its more rapid solubility than alpha lactose. The amount of beta lactose used was substantially equal to the amount of total solids in the concentrate before drying, in this respect corresponding to the proportions of added lactose to total milk solids used in Example 2. It is thus apparent that a powder having the desired characteristics is not produced by the addition of the lactose to a dry powder formed from the other constituents used in the process, even though the added lactose is all in the form of the more soluble beta lactose. Further, the addition of lactose to cream compositions which have a proper balance of calcium to phosphorus for dispersing without feathering, i.e., 0.25 to 0.55, markedly improves the speed of dispersion of the cream product. The product of this example disperses in 75 seconds as compared to the product of Example 2 which disperses in 3.5 seconds.

Example 7

35.2 lbs. of 40% cream were mixed with 119 lbs. of ion exchange treated skim milk similar to that used in Example 2. The total solids content of the mixture was substantially 25 lbs. 25.4 lbs. of lactose were added and the mixture condensed at a temperature of 150° F. to 160° F. under vacuum to 53% total solids. The concentrate was then homogenized and was held at a temperature of 150° F. for 8 seconds in flow through a tubular heating coil. It was then spray dried under conditions to produce a coarse powder of the characteristics hereinbefore described and with about 2% moisture. The powder contained 28.15% butterfat and 59.8% total lactose. The proportion of beta lactose in the final powder was 37%, or about 61% of the total lactose.

When tested in hot coffee at 180° F., the resulting powder settled promptly, but required somewhat longer time than did the powder of Example 2 for complete dispersion. 6 seconds of stirring were required. The whitening ability of the powder was equal to that of the powder formed in accordance with Example 2.

*Example 8*

75.6 lbs. of 40% cream were mixed with 164.4 lbs. of ion exchange skim milk similar to that used in Example 1, i.e., having a calcium to phosphorus ratio of approximately 0.30 and 100.2 lbs. of untreated skim milk. Of the total solids in the resulting mixture, 30.24 lbs. was butterfat, 4.1 lbs. was solids not fat derived from the cream, 12.2 lbs. was solids not fat derived from ion exchange skim milk and 9.5 lbs. was solids not fat derived from untreated skim milk. The calcium to phosphorus ratio of the resulting mixture was approximately 0.65.

The mixture was condensed under vacuum at a temperature of about 150° F. In the absence of the added lactose, the condensing step was carried to only 40% total solids. A portion of the concentrate was homogenized and then spray dried to a low moisture content coarse powder. Powdered beta lactose was thoroughly intermixed with the spray dried coarse cream powder in the proportion of 1 lb. of lactose per each lb. of dry cream powder. This cream powder-lactose hereinafter referred to as product (A) had a particle size comparable to that of the cream powder whose processing is hereinafter described. This lactose powder-extended cream product had a butterfat content of approximately 27% and a lactose content of 60% making this product composition practically identical to that of the hereinafter described product.

To a mixture of fluids similar to that above described and having a calcium to phosphorus ratio of about 0.65, giving dry solids weighing 28 lbs. was added 28 lbs. of alpha lactose and the mixture condensed at a temperature of 150° F. to 160° F. under vacuum to a total solids content of about 57%. The concentrate was homogenized and the concentrate was brought to a temperature of 215° F. to 225° F. and held at this temperature for 12 to 14 seconds under pressure in a tubular heater. The heat treated mixture was spray dried to a coarse powder of a particle size hereinbefore described. This powder is hereinafter referred to as product (B).

An analysis of the product (B) showed that it contained butterfat and lactose content substantially the same as in product (A).

The two products were tested in coffee under identical conditions of temperature and agitation. Results were as follows:

| Test in Coffee @ 180° F | Product (A) Cream Powder and Powdered Lactose Added After Drying | Product (B) Cream Powder and Lactose Added to Condense |
| --- | --- | --- |
| Color | almost none | good. |
| Settling | tends to float and lump | rapid. |
| Wetting | very slow | rapid. |
| Dispersing time | 15 minutes | 3-4 seconds. |
| Feathering | appreciable | none. |
| Oiling | slight | none. |

It is apparent that the addition of lactose in accordance with this invention makes possible the production of dry powders, directly dispersible in hot coffee, from condenses of calcium to phosphorus ratios in the range of 0.55 to 0.85 which condenses do not give directly dispersible powders in the absence of added lactose.

Further, the addition of lactose also permits use of appreciable quantities of the less expensive untreated skim milk as a source of solids not fat.

Tests have shown that the creaming powder prepared in accordance with the present invention is, from the standpoint of its butterfat content, more efficient and more economical than the creaming agents ordinarily employed. For this purpose, the powder prepared in accordance with Example 2 above was compared with coffee cream containing 18% butterfat and with evaporated milk containing 8% butterfat. Cups of coffee from the same brew were employed, all at 180° F. In each case, 6 fluid oz. of coffee were used per cup. The degree of whitening of the coffee resulting from the use of the different creaming agents was matched.

The same whitening effect was secured with 2 grams (1 teaspoonful) of the creaming agent of Example 2 as with 6.6 grams of the 18% coffee cream and with 8 grams of the 8% evaporated milk. The amounts of butterfat represented by these amounts of the creaming agent were 0.54 gram for the powder of the present invention; 1.188 grams for the 18% coffee cream and 0.64 gram for the evaporated milk. Thus, the amount of butterfat required to produce the desired creaming effect was substantially less for the creaming powder prepared in accordance with the present invention than for the other creaming agents tested, and was less than half of the amount of butterfat required in the form of coffee cream. With respect to the evaporated milk, the coffee whitened by the creaming powder of the present invention was free from the characteristic taste of evaporated milk, which was very evident when that material was employed. In taste, the coffee whitened with the creaming powder of the present invention was practically identical with that of the coffee whitened with the coffee cream.

A typical creaming powder of the present invention may be compared with a typical powdered dry whole milk having a similar fat content, the whole milk powder being wholly inadequate as a creaming powder.

|  | Creaming Powder, percent | Whole Milk Powder, percent |
| --- | --- | --- |
| Butterfat | 26.00 | 26.00 |
| Total lactose | 62.00 | 37.00 |
| Beta lactose | 44.00 | 23.00 |
| Protein | 8.00 | 28.00 |
| Mineral | 2.00 | 7.00 |
| Moisture | 2.00 | 2.00 |

In preparing creaming powders in accordance with the present invention, the proportion of cream employed may be varied to provide from about 15% to about 42% butterfat in the final powder, and preferably from about 20% to about 30%. With lower buterfat content, somewhat larger amounts of the powder are required to secure the same creaming effect in coffee, creamed soups and the like. A powder containing from 25% to 28% butterfat has been found commercially desirable, as a level teaspoonful of such a powder produces a creaming effect equivalent to two teaspoonsful of coffee cream (18%), even though appreciably less butterfat is present, as hereinbefore pointed out.

In preparing the powder, ion exchange treated whole milk may be employed in place of the treated skim milk, the amount of cream used being reduced in amount to compensate for the butterfat present in the whole milk.

Although in the foregoing description, cream has been designated as the source of the butterfat in the product, it will be apparent that the butterfat may be supplied in the form of butter oil, which may be thoroughly admixed with the ion exchange treated skim milk or preferably homogenized therewith, prior to condensation. In place of butter oil, other bland vegetable or animal fats may be used, such as those conventionally used in oleomargarine manufacture. In order to supply the milk solids with a low calcium to phosphate ratio, the ion exchange skim milk or sodium caseinate dispersion, as employed in the foregoing description, may be replaced in whole or in part by ion exchange treated whey, preferably derived from sweet milk.

It will be apparent that the products used in preparing the creaming powder in accordance with the present invention may be initially in dried form and may be reconstituted with water for use therein.

By carrying out the process of the present invention, a powdered product is secured in which the constituents are completely integrated with each other, as distinguished from mere mixing or commingling, which does not result in a product meeting the requirements of a satisfactory creaming powder. The drying of the constituents from a common solution or dispersion effects the production of the desired integrated product. Spray drying is preferred, as it results in a product consisting largely of hollow beads or spheres or parts thereof, which are readily dispersed.

The incorporation of the added lactose in the integrated powder as hereinbefore described is an important feature in securing the desirable properties of the product of the present invention. It contributes to the flavor of the product, and restores to the creaming powder some of the sweetness that is usually lost in dehydrating milks and creams, without imparting undesirable sweetness. Its presence during the processing and powdering protects the fat from deterioration due to heat and oxidation. It likewise imparts rigidity and density to the individual powder particles.

Although the present invention has been described in connection with various specific embodiments thereof, it is not intended that the details of such embodiments shall be regarded as limitations upon the scope of the invention except insofar as included in the accompanying claims.

I claim:

1. A rapidly wettable and soluble creaming powder which is rapidly dispersible in hot liquid consisting of coarse dry particles containing in integrated form, from 15% to 42% edible fat, lacteal non-fat solids having a calcium to phosphorus ratio below 0.85, and added lactose equivalent to between 15% and 65% by weight of the total solids in the final product, in excess of 62% of said total lactose being in beta form.

2. A powder as set forth in claim 1 wherein the fat is butterfat.

3. A powder as set forth in claim 1 having a particle size mainly of from 80 to 200 microns with not over 30% fines capable of passing through a 170 mesh screen.

4. A rapidly wettable and soluble creaming powder which is rapidly dispersible in hot coffee having a pH between about 4.8 and 6.3 consisting of coarse dry particles containing in integrated form, from 15% to 42% edible fat, lacteal non-fat solids having a calcium to phosphorus ratio below 0.85, and added lactose equivalent to between 15% and 65% by weight of the total solids in the final product, in excess of 62% of said total lactose being in beta form.

5. A rapidly wettable and soluble creaming powder which is rapidly dispersible in hot liquid consisting of coarse dry particles containing in integrated form, 20 to 30% butterfat, lacteal non-fat solids in proportion to provide a ratio of the sum of such non fat solids and butterfat to butterfat of from 1.5:1 to 2:1, said non fat solids having a calcium to phosphorus ratio below 0.85, and added lactose equivalent to between 15% and 65% by weight of the total solids in the final product, in excess of 62% of said additional lactose being in beta form.

6. A rapidly wettable and soluble creaming powder which is rapidly dispersible in hot liquid consisting of coarse dry particles containing in integrated form, 20 to 30% butterfat, lacteal non-fat solids in proportion to provide a ratio of the sum of such non fat solids and butterfat to butterfat of from 1.80:1 to 1.85:1 said lacteal non-fat solids having a calcium to phosphorus ratio below 0.85, and 30 to 72% total lactose, in excess of 62% of said additional lactose being in beta form.

7. The method of preparing a creaming powder capable of direct dispersion in hot liquid which comprises mixing edible fat, lacteal non-fat solids having a calcium to phosphorus ratio not over 0.85 and added lactose to form a liquid suspension, said added lactose being present in said liquid suspension in dissolved form and in amounts equivalent to between 15% and 65% of the total solids in the final product, and drying the suspension containing the dissolved lactose, when the concentration of solids in the suspension is between 40% and 60%, to form a coarse powder.

8. The method of claim 7 wherein the non fat solids are supplied at least in part in the form of edible non-toxic alkali metal caseinate.

9. The method of claim 7 wherein the fat is butterfat.

10. The method of preparing a creaming powder capable of dispersion in hot liquid which comprises mixing cream and a fluid milk product of the class consisting of whole milk and skim milk, said fluid milk product having a reduced calcium content to provide a calcium to phosphorus ratio in the range from about 0.15 to 0.85, the cream and fluid milk product being admixed in proportions to give a ratio of total solids to butterfat of from 1.5:1 to 2:1, evaporating water from said mixture, dissolving added lactose in said resultant mixture in amounts equivalent to 15% and 65% of the total solids in the final product, heat treating the mixture containing the added lactose whereby the ratio of beta lactose to alpha lactose is increased and drying the heat treated mixture when at a total solids concentration between 40% and 60% to form coarse powder.

11. The method of claim 10 wherein the lactose is added prior to the evaporation step and the evaporation is conducted at a temperature of 130 to 180° F.

12. The method of claim 10 wherein the evaporation is conducted at 150 to 160° F.

13. The method of preparing a creaming powder capable of direct dispersion in hot liquid which comprises forming a fluid suspension of edible fat and lacteal non fat solids having a calcium to phosphorus ratio not over 0.85 in proportions to provide a ratio of total solids to butterfat of from 1.5:1 to 2:1, dissolving added lactose in said suspension in amounts equivalent to between 15% and 65% of the total solids in the final product, concentrating the suspension containing the dissolved added lactose under vacuum to a total solids content of between 50% and 60% in the mixture, holding the resulting condensed mixture at a temperature of 203° F. to about 250° F. for 1–20 seconds whereby the proportion of beta lactose is increased to be in excess of 74% of the total lactose present and drying the mixture to form a coarse powder of not over 2.75% moisture content and thereby stabilize the beta lactose content thereof.

14. The method of preparing a creaming powder capable of direct dispersion in hot liquid which comprises mixing cream and a fluid milk product of the class consisting of whole milk and skim milk, said fluid milk product having a reduced calcium content to provide a calcium to phosphorus ratio in the range from about 0.15 to 0.85, the cream and fluid milk product being admixed in proportions to give a ratio of total solids to butterfat of from 1.5:1 to 2:1, dissolving added lactose in said mixture in amounts equivalent to 15 to 65% of the total solids present in the resulting mixture condensing said resulting mixture at a temperature of from 130° to 180° F. under vacuum to a total solids content of 50 to 60%, holding the resulting condense at a temperature of 203° F. to 250° F. for 1 to 20 seconds, whereby the proportion of beta lactose is increased to be in excess of 62% of the lactose present, and spray drying the mixture to form a coarse bead-like powder of not over 2.75% moisture content and thereby stabilize the beta lactose content thereof.

15. The method of claim 14 wherein the amount of lactose added to the mixture of cream and fluid milk product prior to condensation is such as to provide about 50% of the total solids in the resulting mixture.

16. The method of preparing a creaming powder capable of direct dispersion in hot liquid which comprises mixing edible fat, lacteal non-fat solids having a calcium to phosphorus ratio not over 0.85 and added lactose to form a liquid suspension, said lactose being present in said suspension in dissolved form and in amounts equivalent to between 15% and 65% of the total solids in the final product, heat treating the suspension whereby the ratio of beta to alpha lactose is increased, and drying the suspension containing the dissolved lactose, when the concentration of solids in the suspension is between 40% and 60%, to form a coarse powder.

17. The method of preparing a creaming powder capable of direct dispersion in hot liquid which comprises mixing edible fat and lacteal non fat solids having a calcium to phosphorus ratio not over 0.85 in proportions to provide a ratio of total solids to edible fat of from 1.5:1 to 2:1, dissolving added lactose in said liquid suspension in amounts equivalent to between 15% and 65% of the total solids in the final product, concentrating the suspension containing the added lactose under vacuum to a total solids content of between 40% and 60%, heat treating the liquid suspension whereby the ratio of beta to alpha lactose is increased and drying the heat treated concentrate.

18. The method of preparing a creaming powder capable of direct suspension in hot liquid which comprises mixing edible fat and lacteal non fat solids having a calcium to phosphorus ratio not over 0.85 in proportions to provide a ratio of total solids to edible fat of from 1.5:1 to 2:1, concentrating the liquid suspension, dissolving added lactose in said liquid suspension in amounts equivalent to between 15% and 65% of the total solids in the final product, heat treating the concentrated suspension containing dissolved added lactose whereby the ratio of beta to alpha lactose is increased and drying the heat treated concentrate.

19. The method of preparing a creaming powder capable of direct dispersion in hot liquid which comprises adding fluid cream to skim milk having a calcium to phosphorus ratio in the range between 0.15 and 0.85 in quantities to form an aqueous suspension having a ratio of total solids to butterfat in the range between 1.5:1 and 2:1, dissolving added lactose in said mixture of fluid cream and skim milk in amounts equivalent to between 30% and 65% by weight of the total solids in the complete mixture, concentrating the complete mixture under vacuum to secure a concentrate having a total solids content of between 40% and 60%, homogenizing the resultant fluid concentrate, heat treating the homogenized fluid concentrate at a temperature in the range of 203° F. and 250° F. whereby the proportion of beta lactose is increased to be in excess of 74% of the total lactose present, and drying the heat treated homogenized concentrate.

20. A powder as set forth in claim 1 wherein the lacteal non-fat solids are constituted at least in part in the form of edible, non-toxic alkali metal caseinate.

References Cited in the file of this patent

UNITED STATES PATENTS

| | | |
|---|---|---|
| 2,016,592 | Chuck | Oct. 8, 1935 |
| 2,503,866 | Chrysler et al. | Apr. 11, 1950 |
| 2,611,706 | Bernhart et al. | Sept. 23, 1952 |
| 2,622,984 | Peebles et al. | Dec. 23, 1952 |
| 2,645,579 | Kempf et al. | July 14, 1953 |
| 2,657,142 | Peebles et al. | Oct. 27, 1953 |

FOREIGN PATENTS

| | | |
|---|---|---|
| 8 | Philippines | Apr. 22, 1949 |